Oct. 25, 1960   F. P. MOORE   2,957,389
OPTICAL POINTER
Filed Jan. 14, 1957
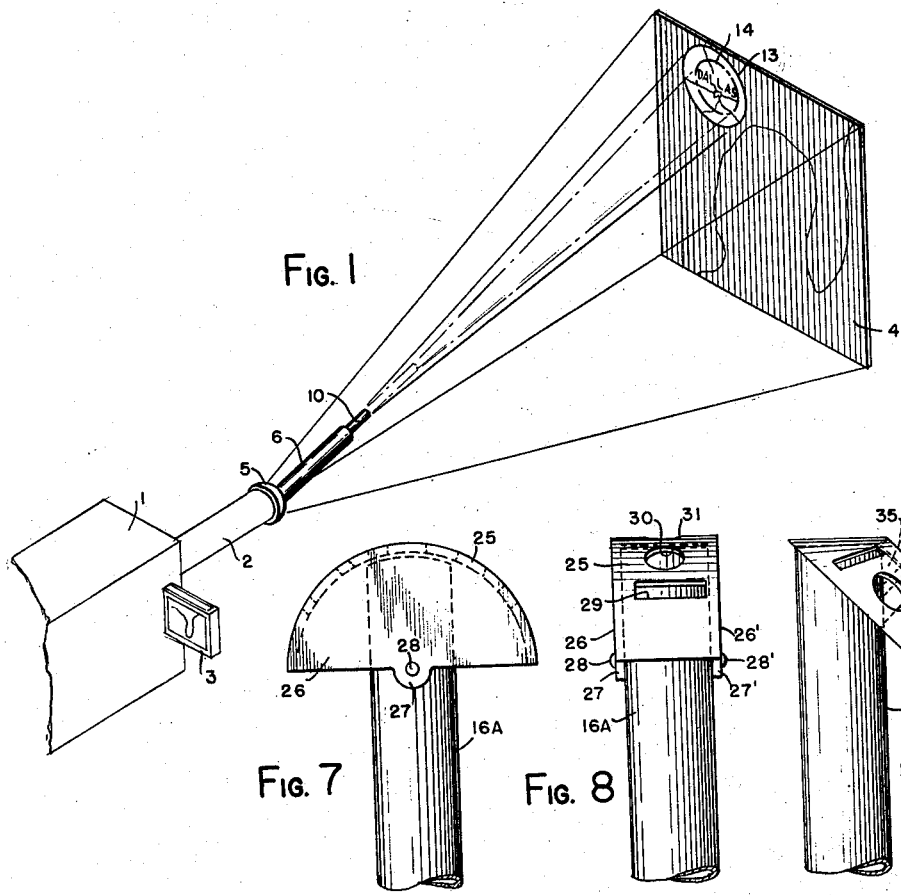
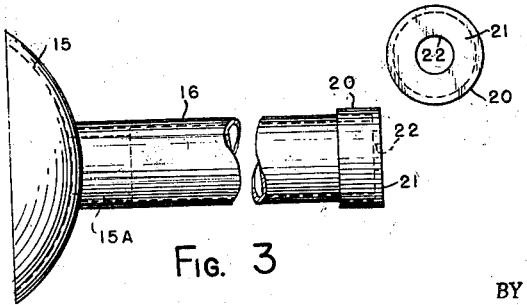
INVENTOR
FRANCES P. MOORE
BY
ATTORNEY

United States Patent Office 2,957,389
Patented Oct. 25, 1960

2,957,389

OPTICAL POINTER

Frances Pauline Moore, Washington, D.C.
(4907 Washington Blvd., Arlington 5, Va.)

Filed Jan. 14, 1957, Ser. No. 633,960

10 Claims. (Cl. 88—24)

The present invention relates to optical systems and more particularly to the projection of images through transparent slides and the indication of a particular portion of the image or the images on the slides.

Heretofore slide and motion picture projectors have been used by lecturers and teachers for the transmission of ideas to an audience, and it has been desirable to point out particular items of interest on the projected image formed on the screen. Heretofore this pointing has been done with a pointer or rod in the hand of the lecturer requiring the lecturer to be close to the screen thereby requiring an assistant for operating the projector. If a capable assistant was not available the lecturer had to return to the projector to change the slides, resulting in undesirable delays. Lights similar to flashlights have been used for projecting an intense light on the screen in the form of an arrow or the like to indicate a point of interest, but such intense light caused the image under the intense light to almost disappear, and it was difficult for the lecturer-operator to maintain the spot of light in a fixed position. Projectors have been provided with an apertured mask closely adjacent the slide with means to move the mask for bringing the aperture over a particular portion of the slide to be shown, and masking the remainder of the slide from view. However, there has been no completely satisfactory and inexpensive way in which a portion of an image could be accurately designated and which could be readily usable on existing equipment without delay or inconvenience to the lecturer or audience.

An object of the present invention is to provide an optical pointer which is easy to use and which overcomes the difficulties in the use of the prior art devices.

A further object is to provide an optical pointer which cuts out a part of a picture and gives a clear image of a small selected area with means to vary the size of the selected area.

Another object is to provide an optical pointer which may be used with a large variety of projectors or other optical equipment.

Another object is to provide a method of limiting the light rays from a slide to a screen by providing a mask between the screen and lens system.

A still further object is to provide equipment for assisting in visual education.

Other objects and advantages will be apparent as the description proceeds and upon reference to the accompanying drawing in which:

Fig. 1 is an isometric view of a projector having the preferred form of telescopic optical pointer of the present invention in operative position with relation to the lens system of a slide projector restricting the clearly projected image to a limited portion of the material on a jected slide and illustrating how extension of the telescopic pointer reduces size of the clearly projected image.

Fig. 2 is a longitudinal section of the optical pointer shown in Fig. 1.

Fig. 3 illustrates a modified form of pointer with an image restricting mask in the form of a cap thereon.

Figs. 4, 5 and 6 are end views of masking caps usable with the pointer of Figs. 3.

Figs. 7 and 8 are side and front elevational views respectively of a fragment of a further modification of optical pointer with a multiple apertured mask of cylindrical form.

Fig. 9 is a further modification with the masking obtained from a frustum of a cone rotatably mounted on the tubular body and having apertures of different sizes and shapes.

Briefly, the present invention is an optical pointer comprising a translucent or opaque apertured concavo-convex base with a tube extending radially from the base for restricting the clearly projected portion of a slide when the pointer is applied to the lens system of a projector. The size of the clearly projected image area can be varied preferably by the provision of a telescoping extension or by the use of cap-like masks or by the use of an apertured disk, cone, cylinder or the like having various shapes and sizes of apertures in the path of light.

Upon more detailed reference to Figs. 1 and 2 of the drawing, a conventional slide projector 1 with the usual lens system in the tubular support 2 and the slide holder 3 is set up to make an image on a screen 4, the image shown being a map of the Gulf of Mexico.

Positioned between the projector and screen and abutting the lens carrying tube of the projector is the preferred form of the optical pointer of the present invention which includes a centrally apertured circular partially transparent or opaque spherically concavo-convex base 5 of suitable material such as a thermo-plastic. A suitable material that has been used is that sold under the trademark, Rohm & Haas Plexiglas Opaque #2025 Black which is partially transparent under intense light so that the entire map can be seen sufficiently for general orientation. A tube 6 is fixed to the base at one of its ends with its bore in registry with the central aperture 8 of the base 5, the tube 6 extending radially outwardly from the base 5. The tubular body 6 may be fastened to the base as shown in Figs. 2 and 3 by a short section of tube 7 of a size to fit snugly the bore of tube 6 and the central aperture 8 in the base, the tube section 7 being securely fixed to both the base 5 and tubular body 6 by suitable means such as an adhesive or the like or by the use of a solvent of the type used for joining plastic materials. A telescoping tube 10 is mounted to slide within the tube 6 and has a tube section 11 fixed to the outer periphery of its inner end while a similar tube section 12 is secured to the inner periphery of the outer end of the tubular body 6 whereby the telescoping tube 10 may move from the retracted position shown in full lines in Figs. 1 and 2 to an extended position shown in dotted lines in Fig. 1 until the tube sections 11 and 12 abut, preventing complete separation of the telescoping tube 10 from the body 6 while providing for intermediate adjustments. One or more light absorbing baffles in the form of disks or tube sections 39 secured to the inner periphery of the tubular body or telescoping tube may be provided to reduce any halo effect on the screen. The telescoping arrangement provides means for varying the size of the projected area of intense light on the screen, from a large area 13 to a smaller area 14 the more extended the tube 10, the smaller the image area of intense light.

To provide for operation of the telescoping tube 10 by manipulation close to the base 5, an outer covering tube may be provided over the telescoping tube 10 and the tubular body 6. The outer tube is secured at its outer end to the telescoping tube 10 by any suitable means such as a rubber nipple or the like whereby longitudinal movement of the telescoping tube 10 can be obtained by manipulation of the covering tube.

In use the pointer is held in the hand and applied to the projector as shown in Fig. 1 and directed to the portion of the image on the screen to be emphasized, being shown as directed to the area around Dallas, Texas, for the purpose of illustration. The shaded portion of the map image on the screen represents what is cut off by the base 5. However it has been found that if the base is not absolutely opaque some light passes through the base and makes a darkened image of the entire slide as illustrated, but the portion that is clearly shown is that represented by the circle of light 13 on the screen and shown unshaded. The size of the circle of the clear image may be reduced by extending the telescoping tube 10 and when extended fully the circle of clear image is redced to the smaller circle 14.

In use, the optical pointer is supported in position with the concave portion of the base 5 in contact with the forwardly extending lip or rim portion 9 of the tubular lens support 2 and the tube 6 being directed toward the portion of the screen having the information to be emphasized. The translucent base 6 permits a limited amount of light to pass therethrough so the entire image projection may be seen but a greater amount of light passes through the tubular body 6 and telescoping tube 10 so that the area around Dallas, Texas, shown in a circle 13 of bright intensity is projected at practically full intensity. Similarly, other portions of the projected image can be pointed out by simply directing the pointer at the portion of the screen on which the selected portion of the image appears.

It will be apparent that a steadying action is obtained by the base engaging the lens support as shown in Figs. 1 and 2 whereby the operator can accurately maintain the pointer in a fixed position.

In the form shown in Figs. 3 to 6 inclusive, upon the base 15 a tubular body is mounted by means of a tube section 15A similar to the tube section 7 and when there are no obstructions, an area of bright intensity is produced on the screen 4.

When the tube 16 is circular the image is indicated by a circle of bright intensity. The size of the circle may be changed by the use of a mask or indicator element or shadow element such as that shown in Figs. 3 and 4 in which a hollow cylindrical cap having an end wall 21 provided with a circular aperture 22 is removably secured on the end of the tubular body 16 by the provision of a snug frictional fit or the like. A mask with an X-shaped aperture 23 is shown in Fig. 5 while a mask with a rectangular opening 24 is shown in Fig. 6.

In Figs. 7 and 8 another form of mask is shown as including approximately one-half of a hollow cylinder having a curved portion 25 and end portions 26, 26' spaced apart approximately the external diameter of a tubular body 16A. Lugs 27, 27' are provided with rivets or the like 28, 28' which extend into apertures in the body 16 whereby the semi-cylindrical mask can be rotated to bring different portions of the cylinder into the path of light passing through the cylinder. Apertures 29, 30 and 31 are provided in the mask to limit the passage of light to the shape of the aperture and obviously other aperture shapes such as ellipses, circles, arrows or the like can be provided for any particular purpose.

In Fig. 9 a further modification is shown in which the mask is made of a frustum of a hollow cone having a peripheral wall 32, a small upper base 33 and an open bottom. A pivot pin 34 passing through the small base 33 and into a lug 35 on a tubular body 16B provides for rotation of the mask so that different apertures therein lie in the path of light passing through the tube. It will be apparent that the outer or masked end of the tubular body of Figs. 7, 8 and 9 may be shaped to the curvature of the cooperating cylindrical or frustum masks.

It will be evident that the masks of the modifications shown in Figs. 4 to 9 inclusive may be applied to the outer end of the telescoping tube 10 if desired.

The tubular body, the telescoping extension, the diaphragms and masks are made of suitable material which preferably does not reflect light to any appreciable extent. Hard black rubber has been used satisfactorily and an opaque rubber has been used for the base.

It has been found that the elongated tube such as that shown in Figs. 1 and 2 with the telescopic extension 10 and the aperture formed by the tube section 7 produces a higher light intensity in the resulting circles of light 13 or 14 than that produced solely by a mask having an aperture of a size to produce the same size circle of light. This is believed to be due to the fact that a greater amount of light can pass through the larger area in the bore of the telescoping extension than can pass through the smaller area of the mask.

It has also been found that the optical pointer accommodates at least in part for improper focusing of the lens system of the projector. The optical pointer of the present invention has wide application for lecturers, teachers, photographers and others who wish to limit the passage of light to a limited area on a film or screen.

In use it is believed that a brief use of the optical pointer to show the specific area is desirable since the observer may see the circle of light and remain oriented when the entire screen is illuminated to its maximum intensity.

The entire slide may be projected through the base 5 or 15 when the base is made of partially transparent material so that the observer can see the entire slide dimly and obtain proper orientation of the image in the circle of light when the optical pointer is directed to the area to be emphasized.

It will be apparent that various changes may be made within the spirit of the invention as described above and within the scope of the appended claims.

I claim:
1. An optical pointer for use with a conventional projector having a lens system and a slide holder for projecting an image on a screen, said optical pointer comprising a base of generally spherically concave shape for engagement with the projecting rim of a lens mount, a tube extending radially outward from said base, said tube being of a length sufficiently great with respect to the lens system with which it is used to limit the light rays through the outer end to those rays that define a limited portion only of the image which would otherwise be projected on the screen.

2. The invention according to claim 1 in which the tube is made of telescoping parts whereby the area being depicted may be varied by telescoping the parts.

3. The invention according to claim 1 wherein the base is made of at least partially transparent material whereby the entire image on a slide can be transmitted through the base to the screen.

4. The invention according to claim 1 in which masking means are provided on the outer end of the tube to limit the area of the image projected whereby a smaller portion of the image is projected from the open tube.

5. The invention according to claim 1 in which the spherically shaped base is made of an opaque material.

6. The invention according to claim 4 in which masking means is provided to limit the image so that a particular portion may accurately be designated for further limiting the area being designated.

7. The invention according to claim 1 in which the base is provided with a light transmitting portion whereby the image of a slide in the projector may be observed while the image indicated by the pointer will be of greater brightness.

8. An optical pointer for use with a picture projector and screen in projecting a picture on a screen comprising a base shield of sufficient size to be positioned in front of the path of light from the projector and between the projector and screen to shield the entire path, said base being provided with an aperture of substantially less transverse dimension in any direction than said base and the path of light from the projector, an indicator element having light masking portions mounted relative to said base for positioning in line with the axis of said aperture in a bundle of light radiating through said aperture from the projector to produce a visible outline of the indicator element of sufficient clarity to be clearly observed on the screen to designate a spot for assisting observers in locating an element of a picture, means to positively position said base and the indicator element with respect to the projector so the aperture and the indicator element lie in the radiating path of a bundle of light rays from said projector, the transverse dimension being such that when the optical pointer is directed on any visible point within the aperture area of the screen the aperture lies within the area of the path of light from the projector.

9. The invention according to claim 8, in which the base has a substantially concave surface for contacting the rim portion of the lens mount of the projector and a tube is mounted on said base in registry with said aperture, said tube having a portion extending in a direction away from said concave surface supporting the indicator element.

10. The invention according to claim 8, in which the base has provision for the passage of less intense light to the screen than the passage of light through the aperture.

References Cited in the file of this patent

UNITED STATES PATENTS

| | | |
|---|---|---|
| 1,119,597 | Henry | Dec. 1, 1914 |
| 1,325,314 | Blackman | Dec. 16, 1919 |
| 1,487,536 | Campau | Mar. 18, 1924 |
| 1,854,665 | Parker | Apr. 19, 1932 |
| 2,143,125 | Headlee | Jan. 10, 1939 |
| 2,242,317 | Metcalf | May 20, 1941 |
| 2,286,628 | Kidder | June 16, 1942 |
| 2,324,133 | Burgess | July 13, 1943 |
| 2,357,542 | Pfeil | Sept. 5, 1944 |
| 2,357,593 | Leavell | Sept. 5, 1944 |
| 2,641,952 | Mellert | June 16, 1953 |